(12) United States Patent
Chang

(10) Patent No.: US 12,373,016 B2
(45) Date of Patent: Jul. 29, 2025

(54) MICROCONTROLLER AND METHOD FOR CONTROLLING THE SAME

(71) Applicant: NUVOTON TECHNOLOGY CORPORATION, Hsinchu (TW)

(72) Inventor: Yu-Jen Chang, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 66 days.

(21) Appl. No.: 18/432,977

(22) Filed: Feb. 5, 2024

(65) Prior Publication Data

US 2024/0272700 A1 Aug. 15, 2024

(30) Foreign Application Priority Data

Feb. 14, 2023 (TW) .................................. 112105190

(51) Int. Cl.
*G06F 1/32* (2019.01)
*G06F 1/3234* (2019.01)

(52) U.S. Cl.
CPC .................................. *G06F 1/3243* (2013.01)

(58) Field of Classification Search
CPC ...................................... G06F 1/32; G06F 9/44
See application file for complete search history.

(56) References Cited

U.S. PATENT DOCUMENTS

| 2008/0148107 A1* | 6/2008 | Takaishi | G06F 11/0757 714/E11.003 |
| 2011/0239031 A1* | 9/2011 | Ware | G06F 13/1689 713/500 |
| 2015/0379992 A1* | 12/2015 | Lee | G10L 15/22 704/275 |

\* cited by examiner

*Primary Examiner* — Keshab R Pandey
(74) *Attorney, Agent, or Firm* — Muncy, Geissler, Olds & Lowe, P.C.

(57) ABSTRACT

A microcontroller including a processing circuit, a function-controlling circuit and a first functional module is provided. The processing circuit is arranged to provide a first enabling signal in an operation mode, and stop providing the first enabling signal in a low power-consumption mode. The function-controlling circuit is electrically connected to the processing circuit, and arranged to generate a first signal in response to the first enabling signal. The first functional module electrically is connected to the function-controlling circuit, and arranged to enable a first function based on the first signal. When the first functional module receives a first triggering event, the first functional module sends a first enabling request to the function-controlling circuit. The function-controlling circuit generates the first signal in response to the first enabling request in the low power-consumption mode, so that the first functional module enables the first function.

15 Claims, 4 Drawing Sheets

MICROCONTROLLER AND METHOD FOR CONTROLLING THE SAME

BACKGROUND

1. Field of the Invention

The present disclosure relates to a technique of energy-saving management for a controller, and more particularly, to a microcontroller and a method for controlling the same.

2. Description of the Related Art

In recent years, with development of portable electronic products, there is increasing demand on both the compactness and lengthiness in time. As the space for containing the battery becomes smaller and the service time is preferably longer, the requirements for the power management design of the microcontroller are becoming more and more stringent.

In the general power management mechanism, the microcontroller and related circuits can be configured in a low power-consumption mode under low usage situations based on characteristics such as the operating states, operating conditions and/or sleeping period, to reduce the power-consumption by reducing the working efficiency of the internal components (e.g., using a lower voltage or reducing the duty cycle, etc.) or disabling some functions.

In the low power-consumption mode, the CPU in a general microcontroller will be in a sleep state, and some functional modules are suspended. In this case, if a specific functional module is triggered to enable a corresponding function, the microcontroller needs to wake up the CPU, and then make the function-controlling circuits, e.g., the clock controller/power controller, to allocate resources to the functional module in a way that the CPU issues control instructions to the clock controller/power controller in order to enable the functional module to perform the required functions. In other words, the microcontroller needs to quit the low-power mode before it can execute functions of a specific functional module, which will cause unnecessary power-consumption in the process. For functional modules, the execution of the functions thereof is based on awakening of the CPU, which is comparatively inefficient in many scenarios of usage.

SUMMARY

The present disclosure provides a microcontroller and a method for controlling the same, which can further improve the power-consumption performance of the microcontroller.

The present disclosure provides a microcontroller, which includes a processing circuit, a function-controlling circuit and a first functional module. The processing circuit is arranged to provide a first enabling signal in an operation mode, and stop providing the first enabling signal in a low power-consumption mode. The function-controlling circuit is electrically connected to the processing circuit, and arranged to generate a first signal in response to the first enabling signal. The first functional module electrically is connected to the function-controlling circuit, and arranged to enable a first function based on the first signal. When the first functional module receives a first triggering event, the first functional module sends a first enabling request to the function-controlling circuit. The function-controlling circuit generates the first signal in response to the first enabling request in the low power-consumption mode, so that the first functional module enables the first function.

The present disclosure provides a method for controlling a microcontroller. The method comprises: determining a current working state of the microcontroller; when in an operation mode, controlling the microcontroller to execute following steps: providing a first enabling signal to a function-controlling circuit, wherein in response to the first enabling signal, the function-controlling circuit provides a first signal to a first functional module; and the first functional module enables a first function based on the first signal; and when in a low power-consumption mode, controlling the microcontroller to execute following steps: stop providing the first enabling signal; determining whether a first triggering event is received, wherein when the first triggering event is received, the first functional module sends a first enabling request to the function-controlling circuit; and in response to the first enabling request, the function-controlling circuit provides the first signal to the first functional module; and controlling the first functional module to enable the first function based on the first signal.

In view of the above, the microcontroller and the associated method in the embodiments of the present disclosure introduces control architecture to actively request for the enabling in a bottom-to-top manner, which makes the functional modules actively issue the request for the provision of the signals required for operations, so that the functional modules are enabled only when there is a need for using the functional modules, and meanwhile the processing circuit can be kept in a low power-consumption mode to further improve the power consumption of the overall microcontroller, so as to achieve to goal of saving power. In addition, by scheduling the enabling request, each functional module cannot be enabled at the same time in the low power-consumption mode, thus avoiding the situation where the instantaneous power-consumption of the microcontroller in the low power-consumption mode is too large.

BRIEF DESCRIPTION OF THE DRAWINGS

In order to allow the abovementioned and other purposes, features, advantages and embodiments of the present disclosure to be more clearly understood, the accompanying drawings are described as following.

DESCRIPTION OF THE PREFERRED EMBODIMENTS

Figure 1:
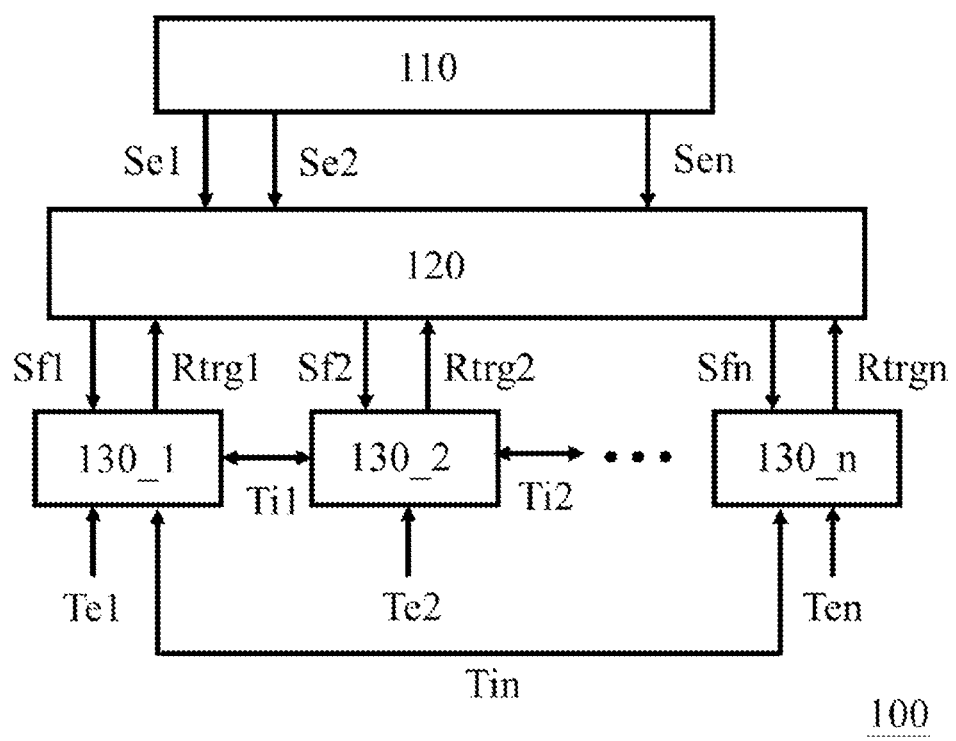
FIG. 1 is a diagram illustrating a microcontroller according to an embodiment of the present disclosure.

The present disclosure proposes a novel microcontroller and a method for controlling the same, to solve the problem mentioned in the background art. In order to make the features and advantages of the present disclosure more obvious and easier to understand, specific embodiments of the present disclosure are described in detail with reference to the accompanying drawings. The following description contains specific information related to exemplary embodiments in the present disclosure. The drawings and the descriptions thereof are only for illustrative purposes, and the present disclosure is not limited thereto. Other variations of the embodiments of the present disclosure can be made by those skilled in the art. Unless otherwise specified, the same or corresponding elements in the drawings may be indicated by the same or corresponding reference numerals. Furthermore, the drawings and illustrations in the present disclosure may neither be drawn in the actual scales nor in actual ratios.

FIG. 1 is a diagram illustrating a microcontroller according to an embodiment of the present disclosure. Referring to FIG. 1, the microcontroller 100 includes a processing circuit 110, a function-controlling circuit 120 and functional modules 130_1-130_n. The processing circuit 110 may be a central processing unit (CPU) for accessing and operating data. The function-controlling circuit 120 is electrically connected to the processing circuit 110, and is used to provide signals required for the operations of the functional modules 130_1-130_n, such as clock signals or power signals. The functional modules 130_1-130_n are electrically connected to the function-controlling circuit 120, and are circuit modules to be controlled to perform corresponding functions in the microcontroller, such as transmission modules, access controllers, memory modules, power management modules, sensors or peripheral input/output devices.

In this embodiment, the number of functional modules 130_1-130_n may be n, where n is a positive integer greater than or equal to 1. In other words, there can be one of more the functional modules, the present disclosure does not further limit the quantity.

Specifically, the microcontroller 100 can be set to have an operation mode and a low power-consumption mode. In the operation mode, the processing circuit 110 provides enabling signals Se1-Sen (also referred to as the first to nth enabling signals Se1-Sen) to the function-controlling circuit 120, so that the function-controlling circuit 120 can generate the signals Sf1-Sfn required by the corresponding functional modules 130_1-130_n (also referred to as the first to nth functional modules 130_1-130_n) in response to the received enabling signals Se1-Sen. When the signals Sf1-Sfn required for operations are received, the functional modules 130_1-130_n will enable corresponding functions.

In other words, in the operation mode, the processing circuit 110 enables the functional modules 130_1-130_n by enabling the function-controlling circuit 120, so that the functional modules 130_1-130_n can execute their corresponding functions in the operation mode.

On the other hand, in the low power-consumption mode, the processing circuit 110 enters the energy-saving state to stop providing the enabling signals Se1-Sen, so that the function-controlling circuit 120 will stop sending the signals Sf1-Sfn. Meanwhile, the functional modules 130_1-130_n may be disabled, suspended or operated in compromised performances, to further reduce the power consumption.

In this embodiment, the functional modules 130_1-130_n may continuously monitor whether the external triggering events Te1-Ten are received or not in the low power-consumption mode, and send enabling requests Rtrg1-Rtrgn to the functional control circuit 120 when it is determined that the external triggering events are received. When the function-controlling circuit 120 receives the enabling requests Rtrg1-Rtrgn, the function-controlling circuit 120 will generate corresponding signals Sf1-Sfn in response to the enabling requests Rtrg1-Rtrgn, so that the functional module 130_1 will enable the corresponding functions.

In general application, to re-enable the functional modules 130_1-130_n in the low power-consumption mode, it is necessary to wake up the processing circuit 110 in the energy-saving state in advance, so that the microcontroller 100 can re-enter the operation mode, thereby making the processing circuit 110 re-sends the enabling signals Se1-Sen to control the function-controlling circuit 120 to send the signals Sf1-Sfn required for operating the functional modules 130_1-130_n. Comparatively, the functional modules 130_1-130_n of this embodiment can actively issue the enabling requests Rtrg1-Rtrgn in the low power-consumption mode to request the functional control circuit 120 to provide the signals Sf1-Sfn required for operations, so that the functional modules 130_1-130_n can be re-enabled to perform the required functions without waking up the processing circuit 110.

In the case that there are a plurality of functional modules 130_1-130_n (n>1), the functional modules 130_1-130_n may generate enabling requests Rtrg1-Rtrgn in response to the received external triggering events Te1-Ten respectively, so that the function-controlling circuit 120 only sends the signals Sf1-Sfn for the functional modules among the functional modules 130 that have received the enabling requests Rtrg1-Rtrgn, while those among the functional modules 130 that have not received external triggering events Te1-Ten are kept in the disabled state.

In addition, when one of the functional modules 130_1-130_n is enabled in response to external triggering events Te1-Ten, it can also generate and send internal triggering events Ti1-Tin to other functional modules of the functional modules 130_1-130_n, according to operational requirements, so that the functional modules of the functional modules 130_1-130_n that have received the internal triggering events Ti1-Tin also send the enabling requests Rtrg1-Rtrgn to the function-controlling circuit 120, in order to be enabled.

For example, in the low power-consumption mode, in response to enabling of the triggering event Te1, the functional module 130_1 can generate and send the internal triggering event Ti1 to the functional module 130_2 when certain trigger conditions are met. When the functional module 130_2 receives the internal triggering event Ti1, it will send an enabling request Rtrg2 to the function-controlling circuit 120, so that the function-controlling circuit 120 can provide the signal Sf2 required by the functional module 130_2 to perform corresponding functions. Similarly, the functional module 130_2 may also use a mechanism similar to the above to generate the corresponding internal triggering event Ti1 to trigger the functional module 130_1 to send the enabling request Rtrg1.

In other words, the microcontroller 100 in this embodiment of the disclosure not only includes a top-to-bottom control architecture (i.e., a control architecture in which the processing circuit 110 initiates controls to request the functional modules 130_1-130_n to execute functions), but also includes a control architecture in which the bottom-to-top request is enabled (i.e., the functional modules 130_1-130_n actively initiate the request to provide operational requirements). In addition, since the above-mentioned bottom-to-top control architecture can operate in a low power-consumption mode (and thus the processing circuit 110 does not need to be awakened), the purpose of saving power consumption can be achieved.

On the other hand, the function-controlling circuit 120 of the disclosed embodiment not only determines whether to provide the signals Sf1-Sfn to the corresponding functional modules 130_1-130_n according to the enabling signals Se1-Sen provided by the processing circuit 110, but also determines whether to provide the signals Sf1-Sfn according to the enabling requests received from the functional modules 130_1-130_n. In other words, the function-controlling circuit 120 may provide corresponding signals Sf1-Sfn based on the enabling signals Se1 to Sen or the enabling requests Rtrg1-Rtrgn.

Figure 2:
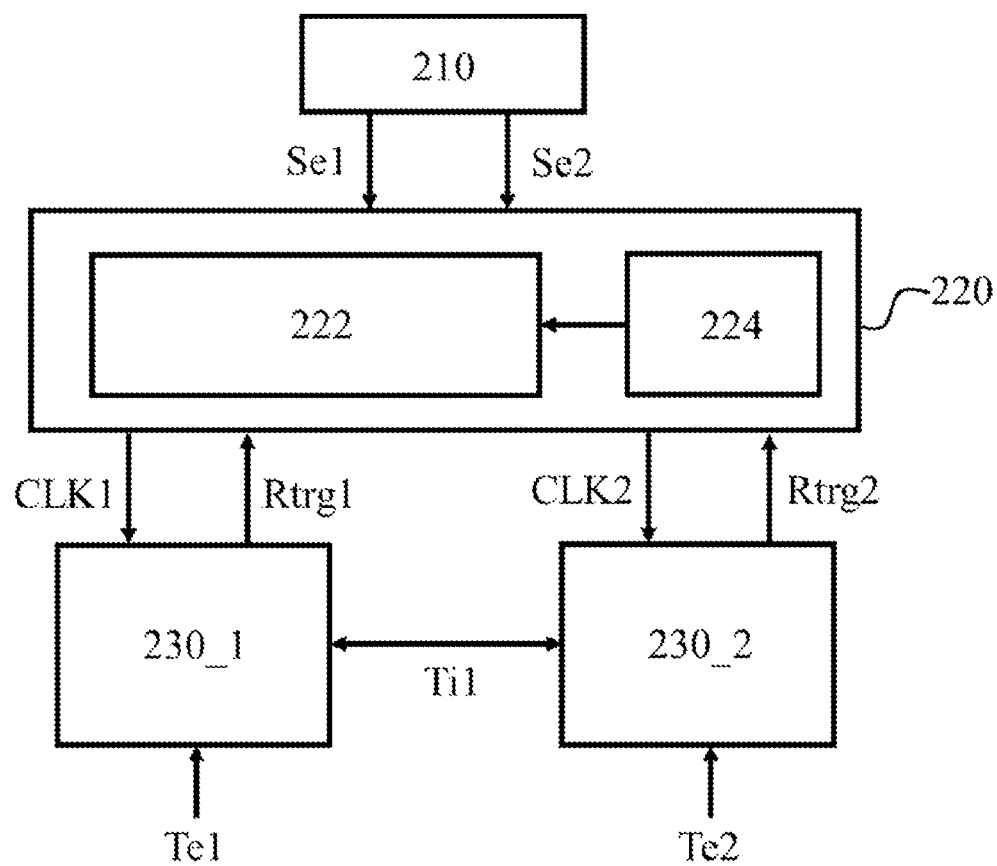
FIG. 2 is a diagram illustrating a microcontroller according to another embodiment of the present disclosure.

Specific examples of the above embodiments will be described below with reference to FIGS. 2 and 3, in which FIG. 2 is a diagram illustrating a microcontroller according to another embodiment of the present disclosure.

In this embodiment, the microcontroller 200 includes a processing circuit 210, a clock-controlling circuit 220, and functional modules 230_1 and 230_2. The clock-controlling circuit 220 of this embodiment provides clock signals CLK1 and CLK2 to the corresponding functional modules 230_1 and 230_2 in response to the enabling signals Se1 and Se2 received from the processing circuit 210, so that the functional modules 230_1 and 230_2 can enable the corresponding functions based on the received clock signals CLK1 and CLK2.

For example, in some practical applications, the functional module 230_1 may be a Serial Peripheral Interface (SPI) bus controller (hereinafter referred to as the SPI controller 230_1), and the functional module 230_2 may be a Peripheral Direct Memory Access (PDMA) controller 230 (hereinafter referred to as the PDMA controller 230_2).

In this example, when the SPI controller 230_1 receives the triggering event Te1 (e.g., a data reading request), the SPI controller 230_1 will send an enabling request Rtrg1 to the clock-controlling circuit 220, so that the clock-controlling circuit 220 provides the clock signal CLK1 to the SPI controller 230_1 in response to the enabling request Rtrg1. After the SPI controller 230_1 receives the clock signal CLK1, it will start transmitting data based on the clock signal CLK1.

In the process of the SPI controller 230_1 transmitting data, the capacity of the internal first-in-first-out buffer (FIFO buffer) therein may gradually decrease. Hence, in some embodiments, SPI controller 230_1 may generate and send an internal triggering event Ti1 to the PDMA controller 230 when a trigger condition is reached during the process of data transmission (e.g., it is determined that the FIFO buffer is about to be fully loaded).

When the PDMA controller 230_2 receives the internal triggering event Ti1, the PDMA controller 230_2 will send an enabling request Rtrg2 to the clock-controlling circuit 220 in response to the internal triggering event Ti1, to request the clock-controlling circuit 220 to provide the clock signal CLK2 to the PDMA controller 230_2. Next, the PDMA controller 230_2 accesses the temporary data in the FIFO buffer of the SPI controller 230_1 based on the clock signal CLK2.

The above examples regarding the SPI controller 230_1 and the PDMA controller 230_2 are merely for illustrative purposes; the present disclosure is not limited thereto. In other embodiments, the SPI controller 230_1 can be any type of transmission module, and the PDMA controller 230_2 can be any type of accessing module.

In some embodiments, the clock-controlling circuit 220 as a function-controlling circuit may include a signal generating unit 222 and a scheduling unit 224. The signal generating unit 222 is used to generate clock signals CLK1 and CLK2. The scheduling unit 224 is electrically connected to the signal generating unit 222, and is used to control the signal generating unit 222 to sequentially provide clock signals CLK1 and CLK2 according to the enabling requests Rtrg1 and Rtrg2 respectively sent by the functional modules 230_1 and 230_2, to enable the functional modules 230_1 and 230_2 in sequence.

Specifically, the scheduling unit 224 may set a schedule according to the priority of executing functions or the need for energy-saving, so that the functional modules 230_1 and 230_2 may sequentially execute functions without being enabled at the same time, thereby avoiding the excessive power-consumption of the microcontroller 200 due to the functional modules 230_1 and 230_2 running at the same time in a short period.

Although the configuration of the above-mentioned scheduling enabling functional modules 230_1 and 230_2 is illustrated by FIG. 2, the present disclosure is not limited thereto. Those skilled in the art, however, are readily to understand that said configuration can be also applicable to the embodiment shown in FIG. 1 or other embodiments.

The above SPI controller 230_1 and PDMA controller 230_2 are taken as an example to explain the embodiment of scheduling control. When the scheduling unit 224 receives the enabling requests Rtrg1 and Rtrg2, the scheduling unit 224 may control the signal generating unit 222 to alternately provide clock signals CLK1 and CLK2, so that the SPI controller 230_1 and the PDMA controller 230_2 can perform corresponding functions in turn.

Figure 3:
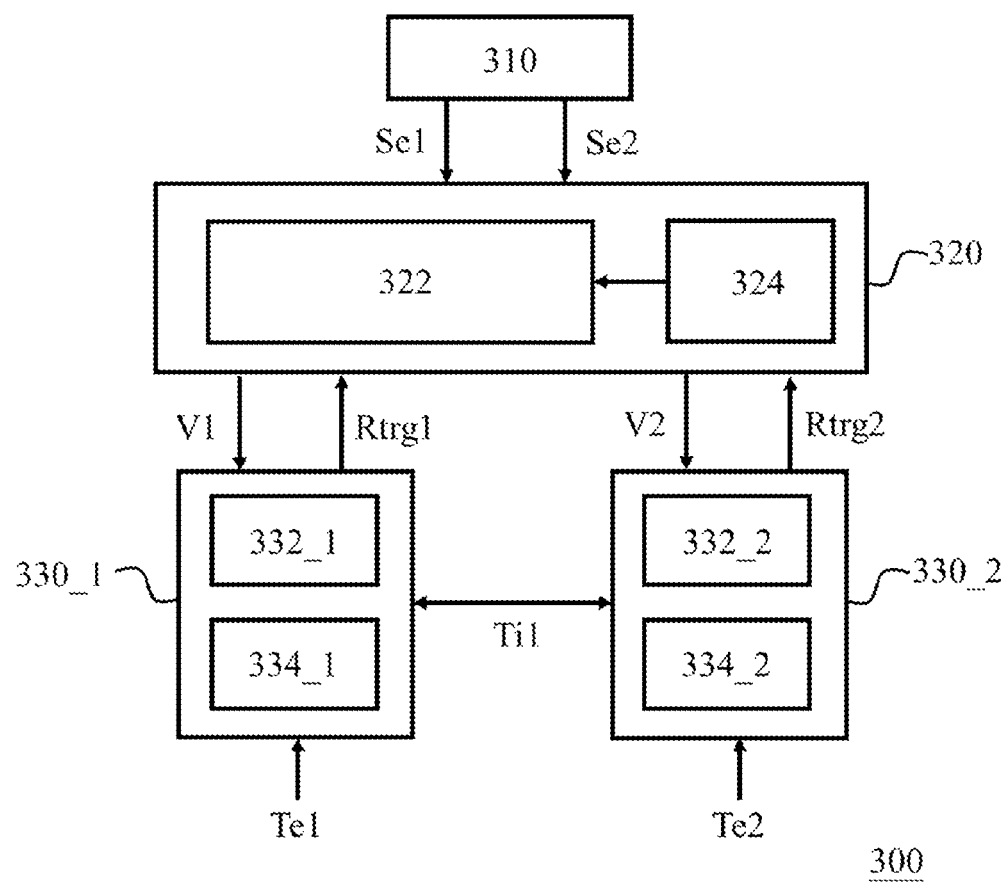
FIG. 3 is a diagram illustrating a microcontroller according to yet another embodiment of the present disclosure.

FIG. 3 is a diagram illustrating a microcontroller according to yet another embodiment of the present disclosure. Referring to FIG. 3, the microcontroller 310 of this embodiment includes a processing circuit 310, a power control circuit 320, and functional modules 330_1 and 330_2. The power control circuit 320 of this embodiment respectively provides power signals V1 and V2 to the corresponding functional modules 230_1 and 230_2 in response to the enabling signals Se1 and Se2 received from the processing circuit 310, so that the functional modules 230_1 and 230_2 can enable corresponding functions based on the received power signals V1 and V2.

The functional modules 330_1 and 330_2 of this embodiment can turn off some functions in a low power-consumption mode and operate in an energy-saving manner to reduce the power-consumption. Specifically, the functional module 330_1 may include circuits 332_1 and 334_1. Similarly, the functional module 330_2 may also include circuits 332_2 and 334_2, wherein the circuits 332_1 and 332_2 are circuits of the functional modules 330_1 and 330_2 that set as enabled by default in the low power-consumption mode, and the circuits 334_1 and 334_2 of the functional modules 330_1 and 330_2 are set as disabled by default in the low power-consumption mode. In other words, some circuits of the functional modules 330_1 and 330_2 will maintain the operations in the low power-consumption mode, and other circuits will stop the operations in the low power-consumption mode, so that the power-consumption of the functional modules 330_1 and 330_2 becomes lower.

Under the above configuration, the power control circuit 320 of this embodiment will provide power signals to the circuits 332_1 and 332_2 of the functional modules 330_1 and 330_2 which are set as enabled by default in the low power-consumption mode. The power signals V1 and V2 provided in response to the enabling requests Rtrg1 and Rtrg2 are provided to the circuits 334_1 and 334_2 which are set as disabled by default, so that the circuits 334_1 and 334_2 which are set as disabled by default are awakened after receiving the power signals V1 and V2, so that the functional modules 330_1 and 330_2 can provide full operation efficiency without waking up the processing circuit 310.

In addition, this embodiment is similar to the embodiment of FIG. 2, and the power control circuit 320 can also have a scheduling function, which includes a signal generating unit 322 and a scheduling unit 324. As the operations of the signal generating unit 322 and the scheduling unit 324 can be referred to the description of the above embodiment, the detailed description thereof are omitted here for brevity.

Figure 4:
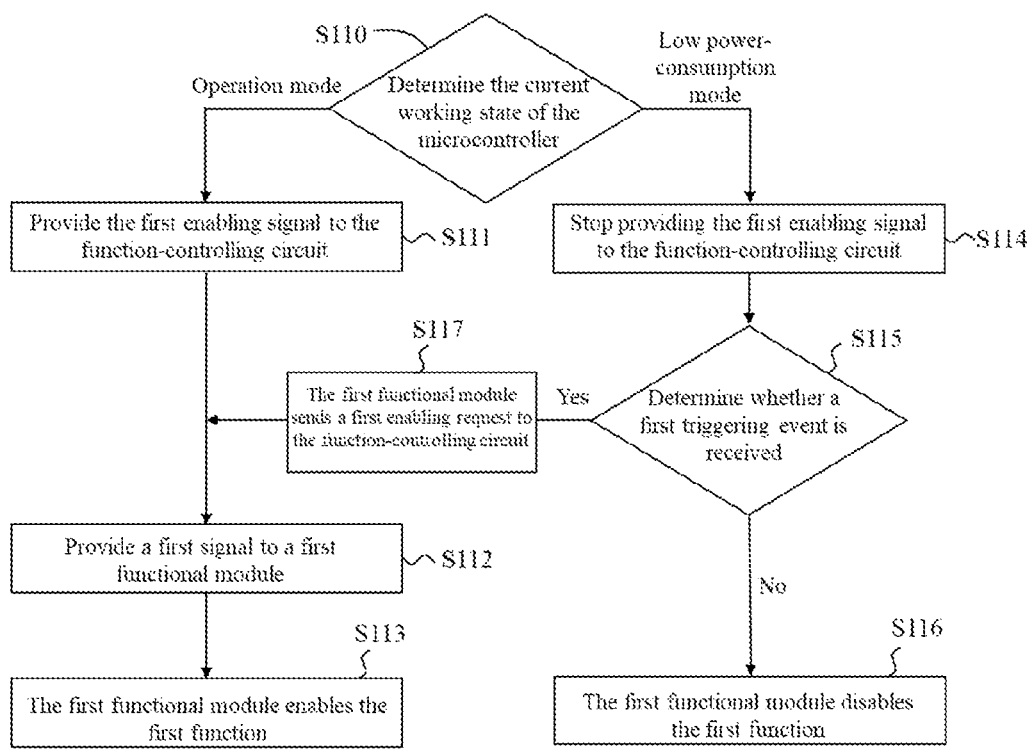
FIG. 4 is a flowchart illustrating steps of controlling a microcontroller according to an embodiment of the present disclosure.

FIG. 4 is a flowchart illustrating steps of controlling a microcontroller according to an embodiment of the present disclosure. Please refer to FIG. 4, the method in this embodiment can be applied to the microcontroller described in FIGS. 1-3. In the control method of FIG. 4, the microcontroller (e.g., the microcontroller 100, 200 or 300) determines whether the current working mode is the operation mode or the low power-consumption mode (see Step S110).

When it is determined that the microcontroller is in the operation mode, the processing circuit (e.g., the processing circuit 110, 210 or 310) will provide the first enabling signal (e.g., Se1) to the function-controlling circuit (e.g., 120, 220 or 320) (see Step S111).

After receiving the first enabling signal, the function-controlling circuit provides a first signal (e.g., Sf1) to the first functional module (e.g., 130_1, 230_1 or 330_1) in response to the first enabling signal (see Step S112), so that the first functional module can enable the first function based on the first signal (see Step S113).

On the other hand, when it is determined that the microcontroller is in the low power-consumption mode, the processing circuit will enter the energy-saving state and stop providing the first enabling signal to the function-controlling circuit, so that the function-controlling circuit can stop providing the first signal to the first functional module (see Step S114). Meanwhile, the first functional module is in the disabled state.

The first functional module in the disabled state will continuously monitor and determine whether the first triggering event (e.g., Te1 or Ti1) is received (see Step S115). If it is determined that the first triggering event has not been received, the first functional module will keep disabling the first function (see Step S116).

On the contrary, if the first functional module receives the first triggering event, the first functional module will send a first enabling request (e.g., Rtrg1) to the function-controlling circuit (see Step S117) to request the function-controlling circuit to provide the first signal.

When the function-controlling circuit receives the first enabling request, the flow will return to Step S112 in which the first signal is provided to the first functional module, and then Step S113 is execute the first functional module to enable the first function.

In view of the above, the microcontroller and the associated method in the embodiments of the present disclosure introduces control architecture to actively request for the enabling in a bottom-to-top manner, which makes the functional modules actively issue the request for the provision of the signals required for operations, so that the functional modules are enabled only when there is a need for using the functional modules, and meanwhile the processing circuit can be kept in a low power-consumption mode to further improve the power consumption of the overall microcontroller, so as to achieve to goal of saving power. In addition, by scheduling the enabling request, each functional module cannot be enabled at the same time in the low power-consumption mode, thus avoiding the situation where the instantaneous power-consumption of the microcontroller in the low power-consumption mode is too large.

What is claimed is:

1. A microcontroller comprising:
   a processing circuit arranged to provide a first enabling signal in an operation mode, and stop providing the first enabling signal in a low power-consumption mode;
   a function-controlling circuit electrically connected to the processing circuit, and arranged to generate a first signal in response to the first enabling signal; and
   a first functional module electrically connected to the function-controlling circuit, and arranged to enable a first function based on the first signal;
   wherein when the first functional module receives a first triggering event, the first functional module sends a first enabling request to the function-controlling circuit; and
   wherein the function-controlling circuit generates the first signal in response to the first enabling request in the low power-consumption mode, so that the first functional module enables the first function.

2. The microcontroller of claim 1, wherein the function-controlling circuit is a clock-controlling circuit, and the first signal is a first clock signal or a first power signal.

3. The microcontroller of claim 2, wherein the first functional module comprises a first circuit and a second circuit, the first circuit is enabled by default in the low power-consumption mode, and the second circuit is disabled by default in the low power-consumption mode, wherein:
   in response to the first enabling request, the power control circuit provides the first power signal to the second circuit in the low power-consumption mode, so that the second circuit is awakened in the low power-consumption mode based on the first power signal.

4. The microcontroller of claim 1, wherein the processing circuit is further configured to provide a second enabling signal in the operation mode and stop providing the second enabling signal in the low power-consumption mode; the function-controlling circuit is further arranged to generate a second signal in response to the second enabling signal; and the microcontroller further comprises:
   a second functional module electrically connected to the function-controlling circuit and the first functional module, and arranged to execute a second function based on the second signal;
   wherein when receiving a second triggering event, the second functional module sends a second enabling request to the function-controlling circuit; and
   wherein the function-controlling circuit generates the second signal in response to the second enabling request in the low power-consumption mode, to make the second functional module enable the second function.

5. The microcontroller of claim 4, wherein when the first functional module enables the first function, the first functional module further generates a third triggering event; when the second functional module receives the third triggering event, the second functional module sends the second enabling request to the function-controlling circuit.

6. The microcontroller according to claim 4, wherein the function-controlling circuit comprises:
   a signal generating unit arranged to generate the first signal and the second signal; and
   a scheduling unit electrically connected to the signal generating unit, and arranged to control the signal generating unit to refer to a schedule to sequentially provide the first signal and the second signal according to the first enabling request and the second enabling request.

7. The microcontroller of claim 4, wherein the function-controlling circuit is a clock-controlling circuit, the first signal is a first clock signal, and the second signal is a second clock signal; the first functional module comprises a transmission module, and the second functional module comprises an accessing module, wherein:
when the transmission module receives the first triggering event, the clock-controlling circuit provides the first clock signal in response to the first enabling request, so that the transmission module transmits data based on the first clock signal;
when the transmission module reaches a trigger condition during data transmission, the transmission module generates and sends a third triggering event to the accessing module, so that the accessing module sends the second enabling request to the clock-controlling circuit in response to the third triggering event; and
the clock-controlling circuit provides the second clock signal in response to the second enabling request, so that the accessing module accesses temporary data of the transmission module based on the second clock signal.

8. The microcontroller as claimed in claim 7, wherein when receiving the first enabling request and the second enabling request, the clock-controlling circuit alternately provides the first clock signal and the second clock signal, so that the transmission module and the accessing module perform corresponding functions in turn.

9. A method for controlling a microcontroller, comprising:
determining a current working state of the microcontroller;
when in an operation mode, controlling the microcontroller to execute following steps:
providing a first enabling signal to a function-controlling circuit, wherein in response to the first enabling signal, the function-controlling circuit provides a first signal to a first functional module; and the first functional module enables a first function based on the first signal; and
when in a low power-consumption mode, controlling the microcontroller to execute following steps:
stop providing the first enabling signal;
determining whether a first triggering event is received, wherein when the first triggering event is received, the first functional module sends a first enabling request to the function-controlling circuit; and in response to the first enabling request, the function-controlling circuit provides the first signal to the first functional module; and
controlling the first functional module to enable the first function based on the first signal.

10. The method for controlling the microcontroller according to claim 9, wherein the function-controlling circuit is a power control circuit, and the first signal is a first power signal, the first functional module comprises a first circuit and a second circuit, and the control method further comprises following steps in the low power-consumption mode:
presetting the first circuit as enabled and the second circuit as disabled; and
when the power control circuit receives the first enabling request, providing the first power signal to the second circuit, so that the second circuit is awakened based on the first power signal.

11. The method for controlling the microcontroller according to claim 9, further comprising:
when in the operation mode, controlling the microcontroller to execute following steps:
providing a second enabling signal to the function-controlling circuit, wherein the function-controlling circuit provides a second signal to a second functional module in response to the second enabling signal, and the second functional module enables a second function based on the second signal; and
when in the low power-consumption mode, controlling the microcontroller to execute following steps:
stopping providing the second enabling signal;
determining whether a second triggering event is received, wherein when receiving the second triggering event, the second functional module sends a second enabling request to the function-controlling circuit; the function-controlling circuit provides the second signal to the second functional module in response to the second enabling request; and the second functional module enables the second function based on the second signal.

12. The method for controlling the microcontroller according to claim 11, further comprising following steps in the low power-consumption mode:
when the first functional module enables the first function, sending a third triggering event to the second functional module; and
when the second functional module receives the third triggering event, sending the second enabling request to the function-controlling circuit.

13. The method for controlling the microcontroller according to claim 11, wherein the step of the function-controlling circuit providing the first signal to the first functional module in response to the first enabling request and providing the second signal to the second functional module in response to the second enabling request comprises:
sequentially providing the first signal and the second signal according to a schedule.

14. The method for controlling the microcontroller according to claim 11, wherein the function-controlling circuit is a clock-controlling circuit, the first signal is a first clock signal, and the second signal is a second clock signal; the first functional module comprises a transmission module and the second functional module comprises an accessing module, and the method further comprises:
when the transmission module receives the first triggering event, the function-controlling circuit providing the first clock signal in response to the first enabling request, so that the transmission module transmits data based on the first clock signal;
when the transmission module reaches a trigger condition during data transmission, the transmission module generating and sending a third triggering event to the accessing module, so that the accessing module sends the second enabling request to the clock-controlling circuit in response to the third triggering event; and
the clock-controlling circuit provides the second clock signal in response to the second enabling request, so that the accessing module accesses temporary data of the transmission module based on the second clock signal.

15. The method for controlling the microcontroller according to claim 14, further comprising:
when the clock-controlling circuit receives the first enabling request and the second enabling request, alternately providing the first clock signal and the second clock signal; and
the transmission module and the accessing module perform corresponding functions in turn based on the received first clock signal and second clock signal.

* * * * *